US007644161B1

(12) United States Patent
Graupner et al.

(10) Patent No.: US 7,644,161 B1
(45) Date of Patent: Jan. 5, 2010

(54) TOPOLOGY FOR A HIERARCHY OF CONTROL PLUG-INS USED IN A CONTROL SYSTEM (75) Inventors: Sven Graupner, Mountain View, CA (US); Tilo Nitzsche, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 11/046,335

(22) Filed: Jan. 28, 2005

(51) Int. Cl.
*G06F 15/173* (2006.01)
(52) U.S. Cl. .................. 709/226; 709/202; 709/223; 719/316; 719/318
(58) Field of Classification Search .................. 709/223, 709/226, 202; 719/316, 318
See application file for complete search history.

(56) References Cited

U.S. PATENT DOCUMENTS

| 5,606,669 | A  | * | 2/1997  | Bertin et al. ............. 709/223 |
| 5,964,837 | A  | * | 10/1999 | Chao et al. .............. 709/224 |
| 6,243,746 | B1 | * | 6/2001  | Sondur et al. ............ 709/220 |
| 6,298,349 | B1 | * | 10/2001 | Toyoshima et al. ........ 707/100 |
| 6,351,734 | B1 | * | 2/2002  | Lautzenheiser et al. ..... 705/8 |
| 6,353,898 | B1 | * | 3/2002  | Wipfel et al. ............ 714/48 |
| 6,546,387 | B1 | * | 4/2003  | Triggs .................. 707/5 |
| 6,628,304 | B2 | * | 9/2003  | Mitchell et al. ........... 715/734 |
| 6,941,362 | B2 | * | 9/2005  | Barkai et al. ............. 709/223 |
| 6,982,960 | B2 | * | 1/2006  | Lee et al. ................ 370/254 |
| 7,020,145 | B1 | * | 3/2006  | Symons et al. ........... 370/400 |
| 7,117,273 | B1 | * | 10/2006 | O'Toole et al. ........... 709/252 |
| 7,167,821 | B2 | * | 1/2007  | Hardwick et al. .......... 703/22 |
| 7,269,821 | B2 | * | 9/2007  | Sahinoja et al. .......... 717/106 |
| 7,296,194 | B1 | * | 11/2007 | Lovy et al. .............. 714/57 |
| 2001/0052006 | A1 | * | 12/2001 | Barker et al. ............ 709/223 |
| 2002/0019864 | A1 | * | 2/2002  | Mayer .................. 709/223 |
| 2002/0091819 | A1 | * | 7/2002  | Melchione et al. ......... 709/224 |
| 2002/0174207 | A1 | * | 11/2002 | Battou .................. 709/223 |
| 2003/0046396 | A1 | * | 3/2003  | Richter et al. ............ 709/226 |
| 2003/0097438 | A1 | * | 5/2003  | Bearden et al. ........... 709/224 |
| 2003/0163555 | A1 | * | 8/2003  | Battou et al. ............. 709/223 |
| 2004/0064349 | A1 | * | 4/2004  | Humenansky et al. ....... 705/7 |
| 2004/0260982 | A1 | * | 12/2004 | Bhowmik et al. .......... 714/43 |
| 2005/0027850 | A1 | * | 2/2005  | Menzies et al. ........... 709/223 |
| 2005/0071482 | A1 | * | 3/2005  | Gopisetty et al. .......... 709/229 |
| 2005/0132032 | A1 | * | 6/2005  | Bertrand ................ 709/223 |
| 2005/0187946 | A1 | * | 8/2005  | Zhang et al. ............. 707/100 |
| 2005/0216585 | A1 | * | 9/2005  | Todorova et al. ........... 709/224 |
| 2006/0041660 | A1 | * | 2/2006  | Bishop et al. ............. 709/224 |
| 2006/0253561 | A1 | * | 11/2006 | Holmeide et al. .......... 709/223 |

OTHER PUBLICATIONS

Ahmed, K. et al., "The Cluster as Server: An Integrated Approach to Managing HPC Clusters", Nov. 2002.
Foster, I. et al., "The Grid: Bluepring for a New Computing Infrastructure", Morgan Kaufmann Publishers, ISBN, 1999, p. 270-293.

(Continued)

*Primary Examiner*—Saleh Najjar
*Assistant Examiner*—Waseem Ashraf (57) ABSTRACT

Information from control plug-ins organized in a hierarchy is received. The control plug-ins control an allocation of resources for an application. Relationships between the control plug-ins are determined based on the received information, and a topology of the control plug-ins is generated.

21 Claims, 5 Drawing Sheets

OTHER PUBLICATIONS

HP Utility Data Center, http://www.hp.com/go/hpudc, downloaded Jan. 25, 2005.
SmartFrog, http://www.smartfrog.org, downloaded Jan. 25, 2005.
Web Services Management Framework, Version 2.0, http://devresource.hp.com/drc/specifications/wsmf/index.jsp, downloaded Jan. 26, 2005.
IBM: xCAT, Extreme Cluster Administration Toolkit, http://www.alphaworks.ibm.com/tech/xCAT, downloaded Jan. 26, 2005.
Globus: Monitoring and Discovery Service (MDS), http://www.globus.org/mds/ mds2, downloaded Jan. 26, 2005.
Global Grid Forum: Open Grid Services Infrastructure v1.0, http://www. gridforum.org/, Jun. 2003.
Oasis: Universal Description, Discovery and Integration (UDDI), http://www. uddi.org, downloaded Jan. 26, 2005.
Sun Microsystems: Sun Grid Engine, http://www.sun.com/software;gridware, downloaded Jan. 26, 2005.

* cited by examiner

TOPOLOGY FOR A HIERARCHY OF CONTROL PLUG-INS USED IN A CONTROL SYSTEM

TECHNICAL FIELD

The technical field relates generally to generating a topology for a hierarchy of control plug-ins used in a control system.

BACKGROUND

Grid computing services, utility-based data centers, and other types of resource-on-demand systems are becomingly increasingly popular as a highly scalable means for utilizing computer resources to meet the computing demands of users. However, managing these resource-on-demand systems is a difficult task that typically requires a significant amount of time and labor and which conventional network management software is not designed to handle.

Many management tasks are performed manually, which tends to be time consuming and costly. For example, selecting computer resources from a pool of resources to assign to a particular user's computing demands is typically performed manually. The monitoring of the pool of resources may be performed using conventional management tools. However, several hundred system administrators may be required, especially for large resource on demand systems such as large utility data centers, to make resource allocation decisions.

SUMMARY

According to an embodiment, information from control plug-ins organized in a hierarchy is received. The control plug-ins control an allocation of resources for an application. Relationships between the control plug-ins are determined based on the received information, and a topology of the control plug-ins is generated.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented in, all types of systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

Figure 1:
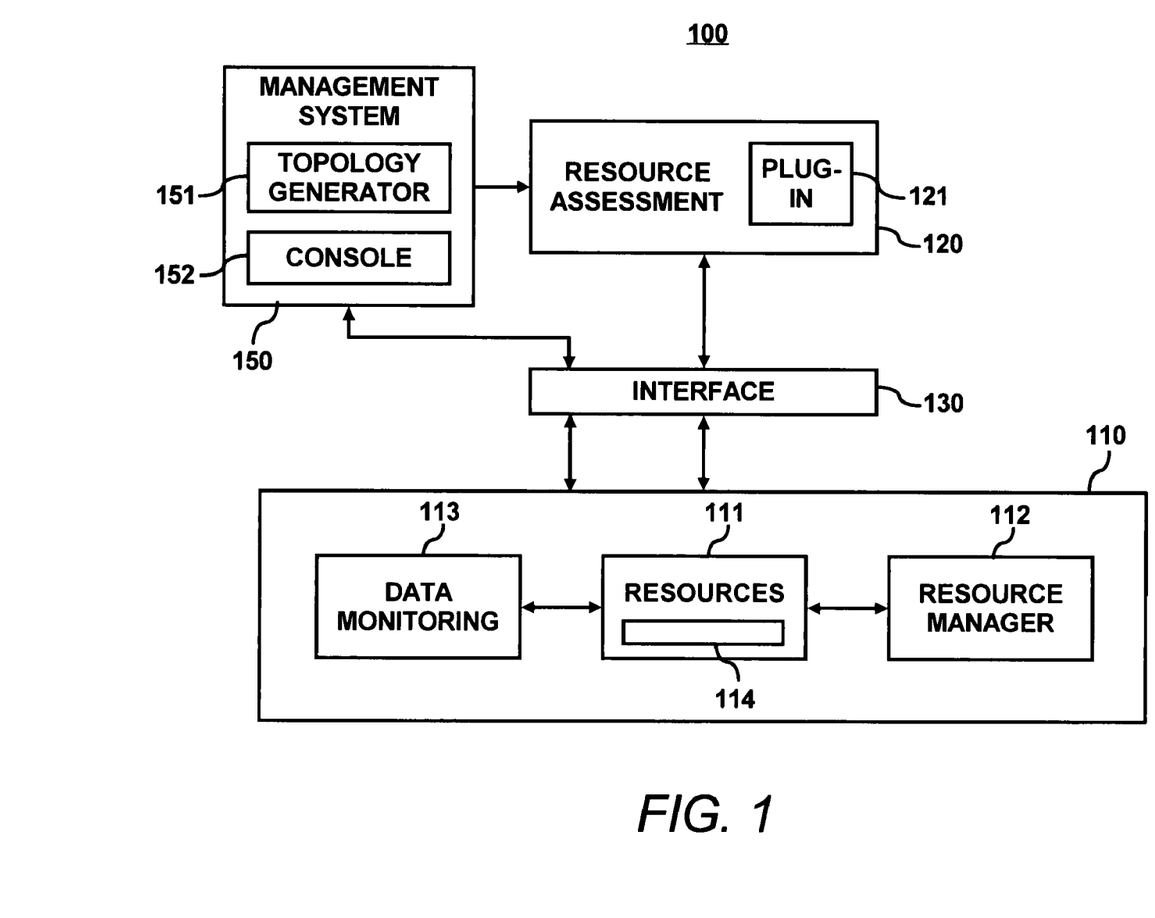
FIG. 1 illustrates a system, according to an embodiment.

FIG. 1 illustrates a system 100 according to an embodiment that provides computer resources on demand and is operable to adjust allocated computer resources as needed. The system 100 includes a resource infrastructure 110 and a resource assessment computer system 120. The resource assessment computer system 120 includes a control plug-in 121 that includes a specifiable policy for allocating computer resources in the resource infrastructure 110. The control plug-in 121 may include parameters and a control function. The control plug-in 121 and other control plug-ins, not shown, may be software that is customizable and executed by the resource assessment computer system 120 for implementing different policies. Control plug-ins are described in further detail below. Furthermore, the resource assessment computer system 120 may include one or a plurality of computer systems, such as one or more servers. Each resource assessment computer system may include and run one or more control plug-ins.

The resource infrastructure 110 includes a pool of computer resources 111, a resource manager computer system 112, and a data monitoring system 113. The resource manager computer system 112 receives instructions for allocating computer resources from the pool of computer resources 111 for a user's computing needs, such as allocating computer resources for a user's application 114. Based on the instructions the resource manager computer system 112 increases or decreases the computer resources allocated for the application 114. The application 114, which is shown in the pool of computer resources 111, is running on a subset of the pool of resources 111 allocated to the application 114 by the resource manager computer system 112. The data monitoring system 113 monitors predetermined metrics of the allocated computer resources as well as the remaining computer resources in the pool and sends monitoring data, which includes measurements of the predetermined metrics, to the resource assessment computer system 120. Examples of the predetermined metrics may include CPU utilization, process queue lengths, IO and network bandwidth, memory utilization and swap rate. If the system 100 is implemented in a data center, the metrics may be collected by data center management software. If application data monitoring is provided, application-level metrics for the application 114 can also be collected, such as transaction rates, response times, numbers of simultaneous sessions, number of users, etc.

The pool of resources 111 may include computer systems or even components of computer systems. One feature of the system 100 is that the number of resources from the pool of resources 111 allocated to an application, such as the application 114, may change during run-time depending on demand the application is facing. Those resources can be flexed which means their capacity can be varied over time. Examples of those resources may include number of CPUs, number of variable server partitions on computer systems that support CPU partitioning, number of entire servers, or varying CPU allocations for or numbers of virtual machines. Resources from the pool of resources 111 are allocated for the application 114. Allocating may include but is not limited to adding servers into an application environment, configuring the servers to run in the application environment, which may include loading the necessary software, releasing servers and un-configuring the released servers from the application environment. CPUs, virtual machines, server partitions, and other types of resources may be similarly configured or un-configured as needed. The allocated computer resources for the application 114 may be adjusted by the resource manager computer system 112.

In one embodiment, the resources are comprised of a server group including a plurality of servers of the same type. Server types may include servers for applications such as web servers, database servers, application servers, and servers used for any type of enterprise application. Examples of server types may include IA32 or lp2000. The application 114 executed by the server group may be a horizontally-scalable application. A horizontally-scalable application is an application that runs on a number of servers in the server group simultaneously. Scalable means that the number of servers may be changed over time. Several instances of the application may be run by the server group. For example, an instance of a web application for online shopping may be duplicated serving different users buying goods or services using the web application. During busy shopping seasons when demand to the e-commerce application is increasing, the resource manager computer system 112 may increase the number of servers in the server group as needed to accommodate the heavier workload. The amount of resources allocated to the application 114 may be adjusted for several reasons, including workload, improving resource utilization (e.g., one or more servers are idle), or supporting other applications hosted by other resources from the pool of resources 111. The environment of the system 100 may be any type of resources on demand environment, which may range from grid computing services to data center services where resources are allocated as needed to one or more applications.

The resource infrastructure 110 contains the pool of computer resources 111 managed by the resource manager computer system 112. The resource manager computer system 112 may be managing several different sets of allocated computer resources for different users running different applications, and the resource assessment computer system 120 may be running several different control plug-ins for each application. A protected domain is formed around the resource infrastructure 110 to prevent unauthorized access to the allocated resources and the resource manager 112, for example, from an unrelated control plug-in, a computer virus, or other unauthorized applications.

An interface 130 is used to implement a protected domain around the resource infrastructure 110. The interface 130 provides security measures for crossing protected domains, such as a domain for the resource assessment computer system 120 and a domain for the resource infrastructure 110. Examples of the data the flows between the protected domains may include requests for monitoring data, such as from the resource assessment computer system 120, and the monitoring data included in the responses to the requests, such as provided by the data monitoring system 113. Also, instructions for adjusting allocated resources may be sent from the resource assessment computer system 120 to the resource manager computer system 112 via the interface 130. Examples of the security measures provided by the interface 130 may include control plug-in authentication and establishing encrypted communication channels. Control plug-ins may be authenticated using certificates. For example, a control plug-in's certificate is validated by the interface 130. Only certificates that are registered at the interface 130 can be validated. Encrypted communication channels can be created as is known in the art. The interface 130 may include software and/or hardware in the computer assessment system 120 and the resource manager computer system 112. In one example, the Open Grid Services Infrastructure (OGSI) or the Web Service Resource Framework (WSRF) is used to implement the interface 130. OGSI and WSRF are standards that define mechanisms for creating, managing, and exchanging information among entities. The mechanisms specified in these standards may be used to provide one or more of the security measures for the interface 130.

Figure 3:
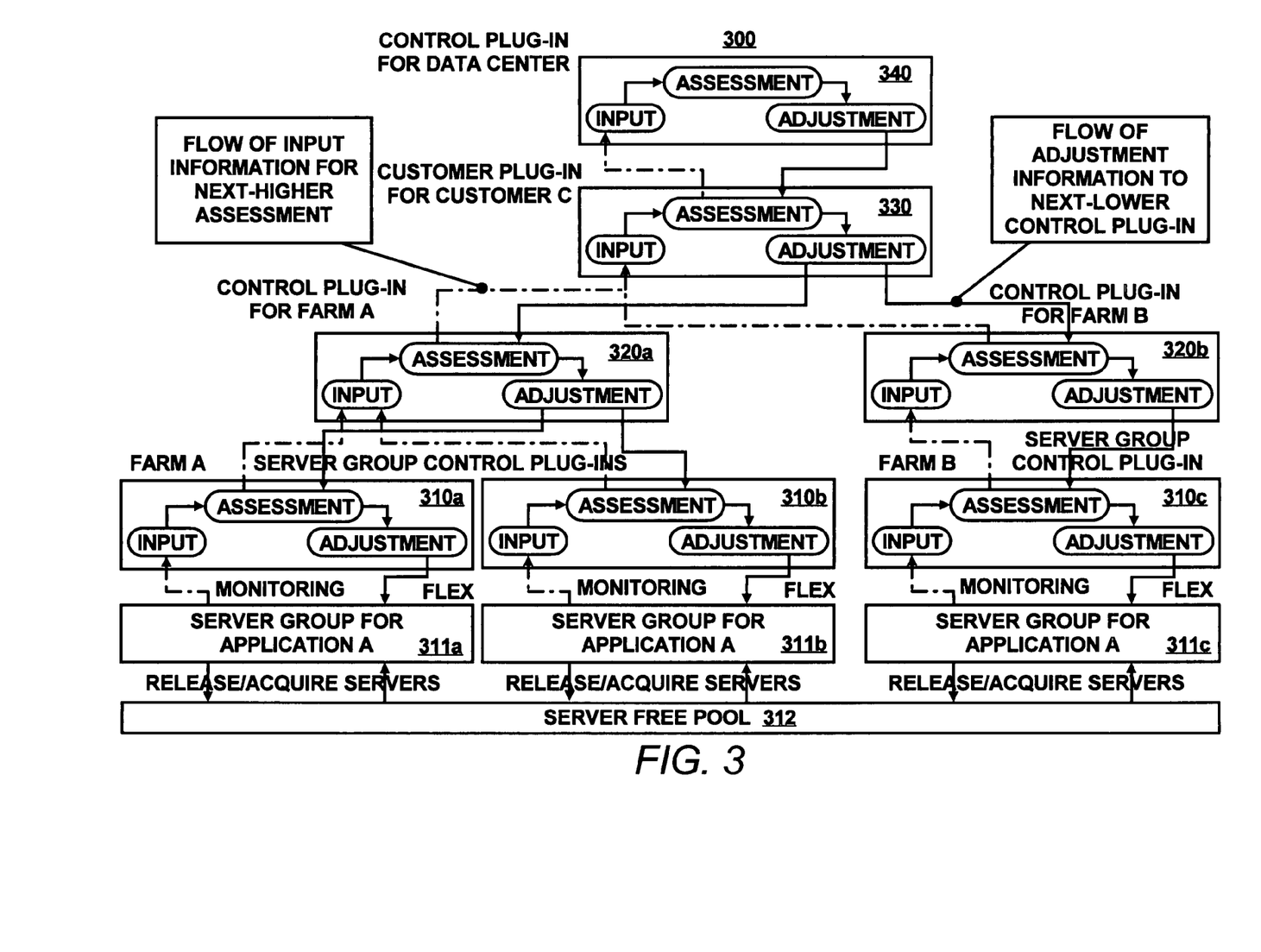
FIG. 3 illustrates control plug-ins in a hierarchal control system, according to an embodiment.

The system 100 also includes a management system 150 including a topology generator 151. The management system 150 communicates with the control plug-in 121 and other control plug-ins (not shown). The system 100 may include a plurality of control plug-ins organized as a hierarchy, such as shown in FIG. 3. The management system 150 receives relationship information from the control plug-ins and the topology generator generates and maintains a topology of the control plug-ins. The topology may be represented visually by the management system 150, such that a system administrator may quickly identify hierarchal relationships between control plug-ins for implementing or revising control policies. The management system 150 also includes an administrator console 151 for inputting new or revised control policies to the control plug-ins. The management system 150 may also be connected to the data monitoring system 113 via the interface 130 to receive metrics for the pool of computer resources 111. These metrics may be used to determine whether to reallocate computer resources if needed.

The resource assessment computer system 120, using the policy provided in the control plug-in 121 and the monitoring data, including the metrics from the data monitoring system 113, determines whether the application 114 and the allocated resources executing the application 114 are operating within defined bounds, such as specified in the control plug-in 121. The rules for this assessment is the policy specified in the control plug-in 121. Based on the assessment, the resource assessment computer system 120 may take corrective action, such as instructing the resource manager computer system 112 to increase or decrease the computer resources allocated to the application 114.

Policies in control plug-ins may be specified through control functions and parameters in the control plug-ins. The control function in a control plug-in may use one or more parameters for assessing allocated resources. In a simple case, a control function in a control plug-in uses upper and lower threshold parameters. For example, parameters of the control plug-in 121 specify an upper and lower threshold for the current load level of a server group allocated for the application 114. When the load level surpasses the upper threshold, the control plug-in 121 makes a decision to flex up, i.e., add more servers into the server group. When the load level falls below the lower threshold, the control plug-in 121 decides to flex down, i.e., release servers from the server group. A third parameter may include a time interval within which load levels have to remain above the upper or below the lower threshold in order to trigger a resource adjustment. The load level may be determined by the metrics measured by the data monitoring system 113 and transmitted to the resource assessment computer system 120. For example, a current load level of a server group may be an aggregate number of metrics for each server, such as CPU load, memory usage, IO activity, and possibly other metrics.

An example of a control function used in a control plug-in may be described as follows:

$F(p1, p2, p3, \ldots) \rightarrow newN$ with $newN=curN$ (no change)
$newN>curN$ (flex up)
$newN<curN$ (flex down)

The control function F calculates a new target number of resources (newN) that satisfies desired performance under current conditions based on the parameters ($p=p1$, $p2$, $p3 \ldots$). The newN is the target number of resources, such as servers in a server group, and curN is the current number of resources allocated for an application, such as the current number of servers in a server group for the application. If the target number of servers is equal to the current number of servers, then, for example, there is no change instructed by the resource assessment computer system 120 running the above-described control plug-in. If the target number of servers is less than the current number of server, then the resource assessment computer system instructs the resource manager computer system 112 to flex up. If the target number of servers is greater than the current number of server, then the resource assessment computer system instructs the resource manager computer system 112 to flex down.

The parameters p used by the control function F may include "operational conditions" in the underlying controlled system, such as the load level in a server group. The parameters p may also describe the "desired conditions" such as boundaries or thresholds within which a control system operates, such as the control system 200 shown in FIG. 2 and described in detail below. Desired conditions also include preferences or constraints to be obeyed by the control system. An example is described below for a set of parameters p1 ... p7 for a control function.

An example of a parameter set for operational conditions may include:
p1:LL (current load level in a server group);
p2:curN (current number of servers in a server group).
An example of a parameter set for desired conditions may include:
p3:LPSupp (upper threshold for load per server: (LL/curN), e.g. 80%);
p4:LPSlow (lower threshold for load per server: (LL/curN), e.g. 40%).
An example of hard constraints within the desired conditions may include:
p5: min.servers (minimal number of servers that must be maintained in the server group);
p6: max servers (maximal number of servers that must be maintained in the server group).
An example of preferences within the desired conditions may include:
p7: pref_LoadLevelPerServer (preferred load level of a server with: LPSlow≦pref_LoadLevelPerServer≦LPSupp).

The behavior of a control plug-in can be influenced by the parameter set p1 ... p7. An example below includes a control function utilizing the parameter set p1 ... p7. This control function is invoked any time a change in one of its input parameters p1 ... p7 occurs, which may be reported to the resource assessment computer system 120 as a parameter change event from the data monitoring system 113.

int control Function(LL, curN) //arguments from parameter set p1 ... p7
{LLPS=LL/curN; //current load level per server
newN=curN; // don't flex when LLPS remains within bounds
if (LLPS>LPSupp or LLPS<LPSupp or surplusControl)
{newN=RoundUp (LL/pref_LoadLevelPerServer);
newN=max(min(newN, max_Servers), min_servers);}
return newN;}

When the load per server exceeds the upper threshold or falls below the lower threshold, or the parameter set has changed, the new number of servers is calculated by:
newN=LL/pref LoadLevelPerServer.
The new number of servers is bound to constraints:
newN=max(min(newN, max servers), min servers).

The control plug-ins are customizable. Adjusting any of the parameters describing desired conditions changes the control decisions made by the control plug-in. By providing a new or changing the existing parameter set p1 ... p7, users, system administrators operators, or systems, such as a server surplus control system, can influence the result of the control function performed by the control plug-in. Also, control plug-ins may comprise software provided by the user, the system administrator, or another system. By using control plug-ins, the system 100 can easily receive and accommodate new policies for allocating the resources 111.

Furthermore, control plug-ins may be included in a hierarchal control plug-in architecture, where each intermediate layer in the hierarchy receives input that could change a parameter and generates an output, such as a control decision to change a parameter of a lower level control plug-in. At the bottom layer, the control plug-in's may output flex up or flex down instructions.

Figure 2:
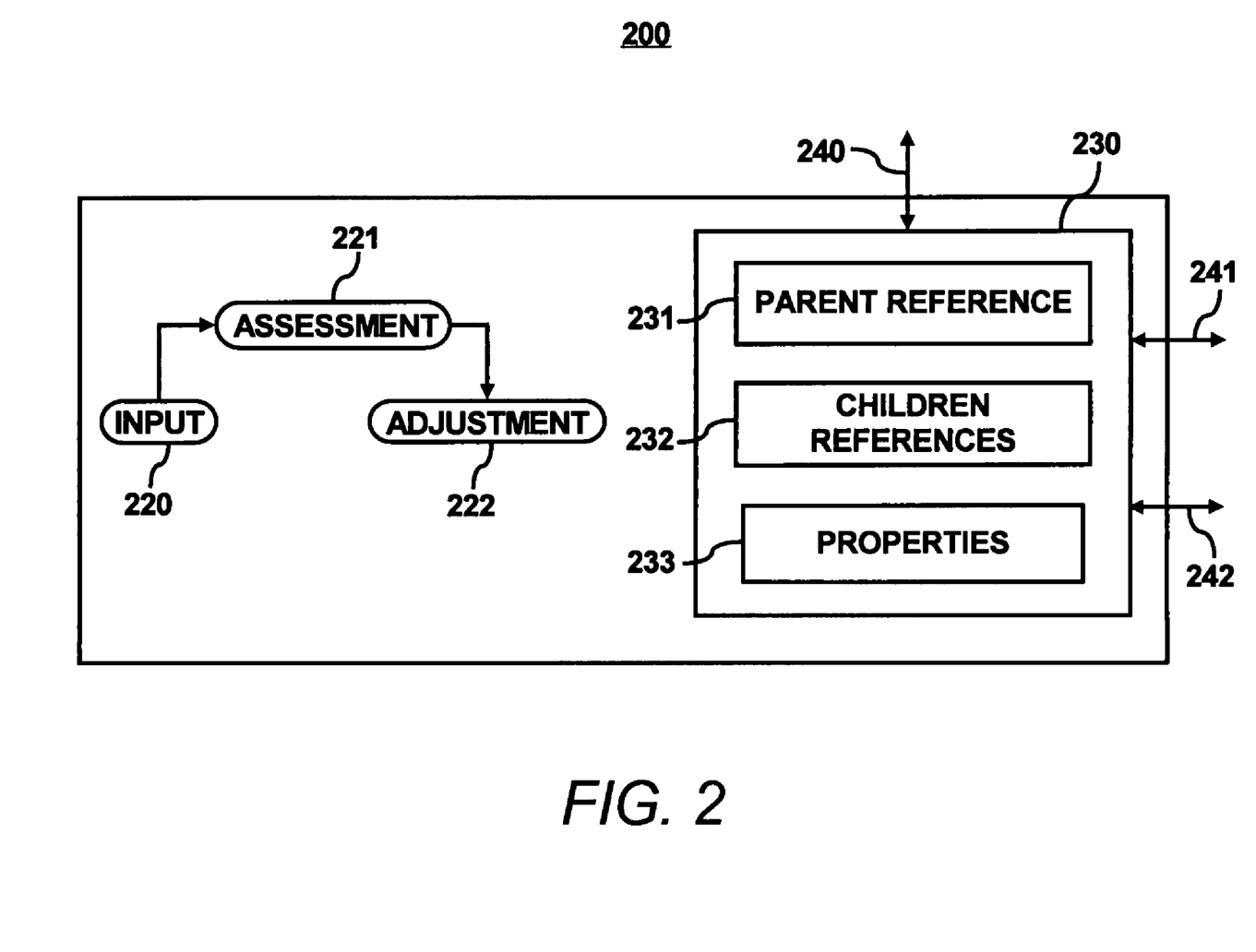
FIG. 2 illustrates a control plug-in structure, according to an embodiment.

FIG. 2 illustrates a structure 200 for control plug-ins organized in a hierarchy in a control system. The structure 200 may be used for a control plug-in at any level of the hierarchy. An example of a control system using a hierarchal control plug-in architecture is described below and shown in FIG. 3.

The structure 200 includes an input function 220, an assessment function 221, and an adjustment function 222. The input function 220 receives information from lower-level control plug-ins. The input function 220 may also receive monitoring data from the data monitoring system 113 shown in FIG. 1, which can be forwarded in part or all to higher-level control plug-ins depending on whether the higher-level control plug-ins subscribed to receive the monitoring data. This is one form of filtering performed by a control plug-in. That is the input function 220 may determine the metrics in the monitoring data that the higher-level control plug-in subscribed to and sends those metrics to the higher-level control plug-in.

The assessment control function 221 processes the input information using a control function and determines whether to adjust parameters for a lower-level control plug-in or to instruct the resource manager 112 shown in FIG. 1 to allocate computer resources, such as increasing or decreasing the number of servers in a server group. The assessment function 221 may also send processed information to a higher-level control plug-in, such as whether as the application is performing "in range" or not, or over which periods of time the application has performed "in range" or "out of range". The range may be related to workload or other factors.

The adjustment function 222 generates instructions, if needed, for adjusting parameters for the lower-level control plug-in or instructions for the resource manager 111 to adjust computer resources allocated for applications. The assessment control function 221 and the adjustment function 222 may also generate and output event subscription requests. These requests are received by a lower-level control plug-in which notifies the higher-level control plug-in when the event occurs. Examples of event information received may include the number of servers in a server group, a current farm state (active or inactive), the number of servers in the server free pool 212, workload information (CPU utilization, memory utilization, etc.), and others. Events may be categorized by type, such as monitoring and farm life cycle, by topic, such as determined by a computer resource infrastructure, and by origin, such as a particular server group. Events may be subscribed to using these categories.

In addition to the functions 220-222, the structure 200 includes a data structure 230. The data structure 230 stores relationship and property information for a control plug-in.

The relationship information includes a parent reference 231 to a parent control plug-in, which is a control plug-in at a higher level in the hierarchy that is operable to send instructions to the control plug-in. The parent reference 231 includes an identification of the parent control plug-in. The relationship information also includes one or more children references 232, which may include control plug-ins at a lower level in the hierarchy that are operable to receive instructions from the control plug-in. The children references 232 may include an identification for each child control plug-in.

The data structure 230 also holds property information 233. The property information 233 includes attributes of the control plug-in, such as version, system administrator responsible for the control plug-in, customer associated with the control plug-in, and the like. The property information 233 may be stored as key, value pairs which are values for a plurality of parameters, such as vendor, version, customer, system administrator, and the like. The property information is used for management operations performed by the managements system 150 shown in FIG. 1 for the control system.

The structure 200 may also include a discovery port 240, a maintenance port 241, and a property port 242. The discovery port 240 receives and subscribes to the relationship information. Instructions, such as getParent( ) and getchildren( ) may be sent to other control plug-ins via the discovery port 240 to get the relationship information. Also, instructions for subscribing to events, such as subscribe (eventDest, eventType), are communicated via the discovery port 240 and are used to subscribe to event notifications issued by control plug-ins to all recipients that have subscribed for those events. These events may be associated with changes that affect the topology, such as when control plug-ins are added or removed. Examples of event types are child change events with subtypes for a child insert event or a child remove event. When a new control plug-in is inserted in the control hierarchy, its parent will trigger a child insert event informing all subscribers about this change. The primary subscriber for this event is a control plug-in related to the added control plug-in, such as a parent, grandparent, or another child. Similarly, when a control plug-in is removed from the hierarchy, its parent will trigger a child remove event to the control plug-ins that subscribed to that type of event. Root nodes of the control hierarchy always exist and thus a topology can always be generated.

The maintenance port 241 is for sending and receiving information related to generate and maintain the topology. The information is sent to the topology generator 151 via the maintenance port 241 so the topology generator 151 may generate and maintain the topology. Examples of information sent via the maintenance port 241 to the managements system 150 shown in FIG. 1 generating the topology may include setParent(parent), insertChild(child), insertChild(child, afterChild), removeChild(child). For example, after a control plug-in receives information that a new child control plug-in is inserted, such as in response to subscribing to that event, the control plug-in notifies the management system 150 which updates the topology.

The property port 242 is for sending and receiving the property information 233. Examples of instructions sent via the property port 242 may include setProperty(key, value), getProperty(key), and getKeys( ). The management system 150 may receive property information sent via the property port 242 and store and display the property information if the display is requested by a system administrator.

The input function 220 may include functions for sending and receiving the relationship information described above with respect to the ports 240-242, which is used to generate and maintain the topology. Also, the assessment function 221 may include functions for generating the data structure 230 holding the information described above.

The structure 200 may include other ports not shown for transmitting and receiving information to and from control plug-ins in the hierarchy. The information may include instructions transmitted to lower-level control plug-ins for controlling the allocation of computer resources for an application or instructions transmitted to the resource manager 112 shown in FIG. 1. The information may also include monitoring data from the data monitoring system 113 shown in FIG. 1 or event information subscribed to by a higher-level control plug-in. These ports are described in U.S. patent application serial number (TBD, attorney docket no. 200400592-1), entitled "Hierarchal Control System For Controlling The Allocation Of Computer Resources", which is incorporated by reference in its entirety.

A control plug-in may include software and the functions 220-222 of the structure 200 may be implemented as software modules. The ports can be software ports for sending and receiving the information described above.

FIG. 3 illustrates a hierarchal control system 300, which includes a control system having control plug-ins arranged in a hierarchy. In the example shown in FIG. 3, servers are the pool of computer resources 111 of FIG. 1 that are released from or added to server groups running applications. It will be apparent to one of ordinary skill in the art that other types of resources may also be used. Also, control plug-ins are represented using the functions of the structure 200 shown in FIG. 2. The ports 240-242 and the data structure 230 are not shown but are included for each control plug-in. The data flows of input data to control plug-ins are illustrated using dotted lines and the data flow of output data from control plug-ins are illustrated using solid lines.

As shown in FIG. 3 and described in detail below, control plug-ins at intermediate levels may receive input data from lower level control plug-ins to make an assessment decision on whether to adjust parameters in a lower-level control plug-in, which may result in adjusting the allocation of servers for a server group.

The system 300 includes control plug-ins at different levels of the hierarchy. The control plug-ins may be stored and executed by the resource assessment computer system 120 of FIG. 1, which may include multiple servers running one or more of the control plug-ins. In the example shown in FIG. 3, control plug-ins 310a-c at the lowest level of the hierarchy in the system 300 are each responsible for flexing server groups, such as increasing or decreasing the number of servers in the server groups 311a-c based on control functions and parameters in the control plug-ins of the system 300. As the server groups 311a-c are flexed, servers are either released to or acquired from the server free pool 312. The server free pool 312 includes the servers currently not utilized by any server groups. A single server free pool is shown in FIG. 3. However, a server free pool is provided for each application type. For example, web server application types utilize servers from a web server pool, and database application types utilize servers from a database server pool. Also, the server free pool 312 is part of the pool of resources 111 shown in FIG. 1 and is monitored by the data monitoring system 113.

The input data for the control plug-ins 310a-c may include monitoring data from the data monitoring system 113 shown in FIG. 1 measuring metrics for each server group. The output data may include instructions for flexing a server group if needed.

One or more server groups running an application are referred to as a farm. For example, the server groups 311a-b run instances of the application A and are in the farm A. The server group 311c is in the farm B and runs instances of the application B. The control plug-ins 320a-b are in an intermediate level of the hierarchy in the system 300 and include control functions for controlling farms. The control plug-ins 320a and 311a-b include control functions for allocating servers for the farm A, and the control plug-ins 320b and 310c include control functions for allocating servers for the farm B. The control plug-ins 320a-b receive data assessment information from respective lower level control plug-ins and may output adjustment data including adjusted parameters for the control functions of the respective lower level control plug-ins. Adjusted parameters may include new parameter values for a parameter set. The adjustment data may include but is not limited to revised thresholds for the parameters for the lower level plug-ins such that unutilized servers in the server free pool 312 are allocated or to re-allocate servers to server groups that need them.

The control plug-in 320 is at the customer level and includes control functions for administering policies, for example, for customer C. For example, customer C may desire better performance for application A, and thus new parameters may be output to the control plug-in 320a resulting in an increased number of servers being allocated for the server groups 311a-b. The control plug-in 340 is at the data center level and may include control functions for administering data center policies. For example, the servers in the server groups 311a-c and the server free pool 312 may be provided in a data center and subject to the policies of the data center.

Figure 4:
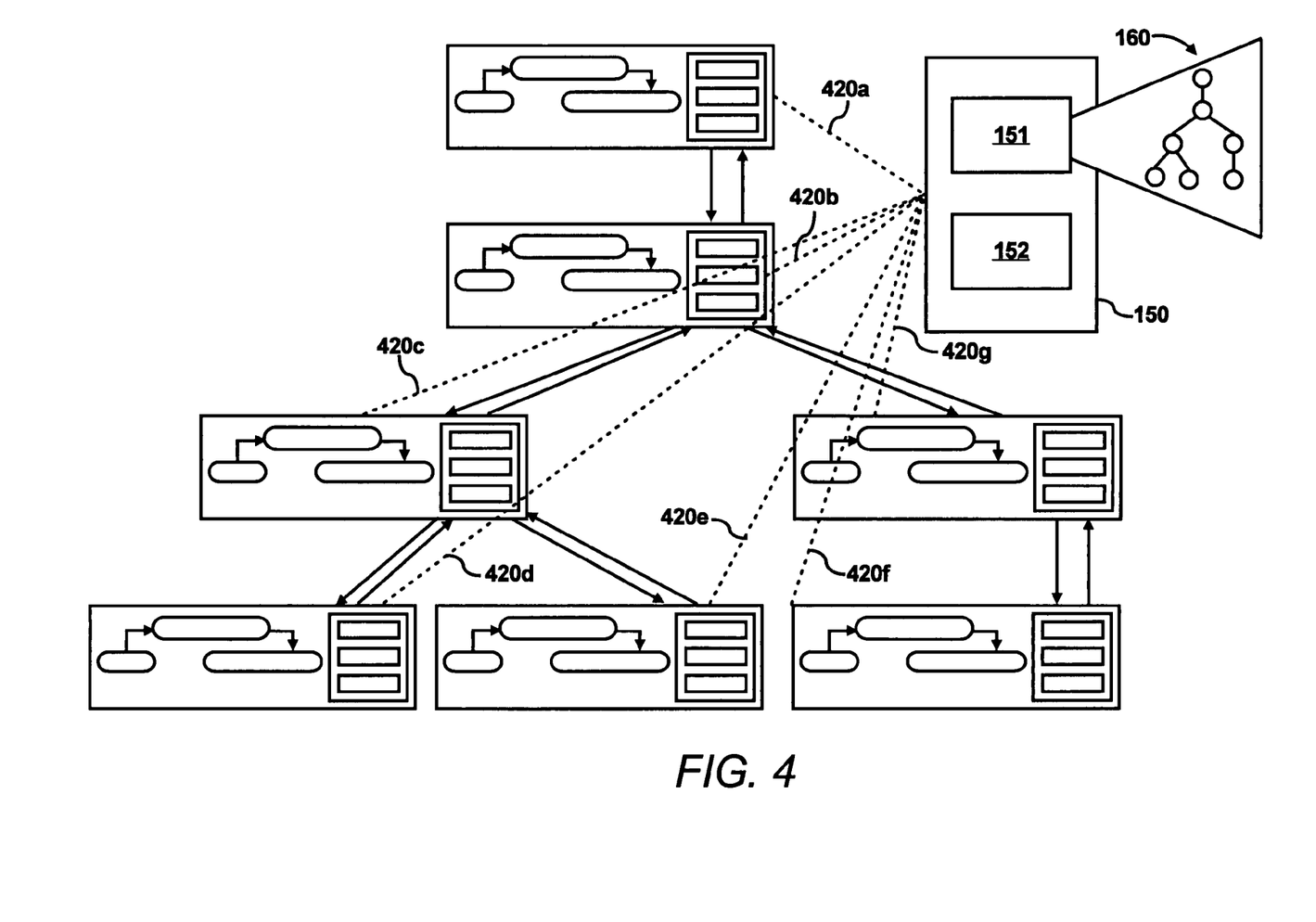
FIG. 4 illustrates a management system communicating with control plug-ins, according to an embodiment.

FIG. 4 illustrates the control plug-ins of the system 300 shown in FIG. 3 communicating with the management system 150 shown in FIG. 1 to generate a topology 160 of the control plug-ins. The control plug-ins are organized in the hierarchy as shown. In FIG. 4, the data structure 230 and the ports 240-242 shown in FIG. 2 are shown for each of the control plug-ins.

The management system 150 includes links 420 to the root control plug-in as well as to the remaining control plug-ins in the hierarchy. The links 420 may be used for communicating relationship and property information to the topology generator 151 to generate and maintain the topology 160.

For example, via the links 420, the topology generator 151 receives at least one of a reference to a parent and a child control plug-ins for each control plug-in in the hierarchy. This information is used to generate the topology 160. The topology generator 150 also receives event information associated with changes in topology, such as when a control plug-in is added to or removed from the hierarchy or suspended or resumed. This information is used to synchronize changes in the hierarchy with changes in the topology 160. Also, if a control plug-in is removed, the topology generator 151 may automatically remove all the children as well as the node corresponding to the removed control plug-in from the topology 160.

A system administrator may use the console 152 to inspect the state of the control plug-in hierarchy based on information that is present in the topology 160. The topology generator 151 may generate a visual representation of the topology 160, such as shown in FIG. 4, including nodes and links mirroring the hierarchy of the control plug-ins. This visual representation may be inspected by the system administrator via the console 152 to perform management operations. The system administrator can select a node of the topology 160 and issue a control operation for that node which is propagated to the corresponding control plug-in, such as shown at 410. Examples of such control operations are suspend or resume the control function of the control plug-in or start or stop the control plug-in. The system administrator may also modify parameters or control functions of a control plug-in to implement a new or revised policy.

Figure 5:
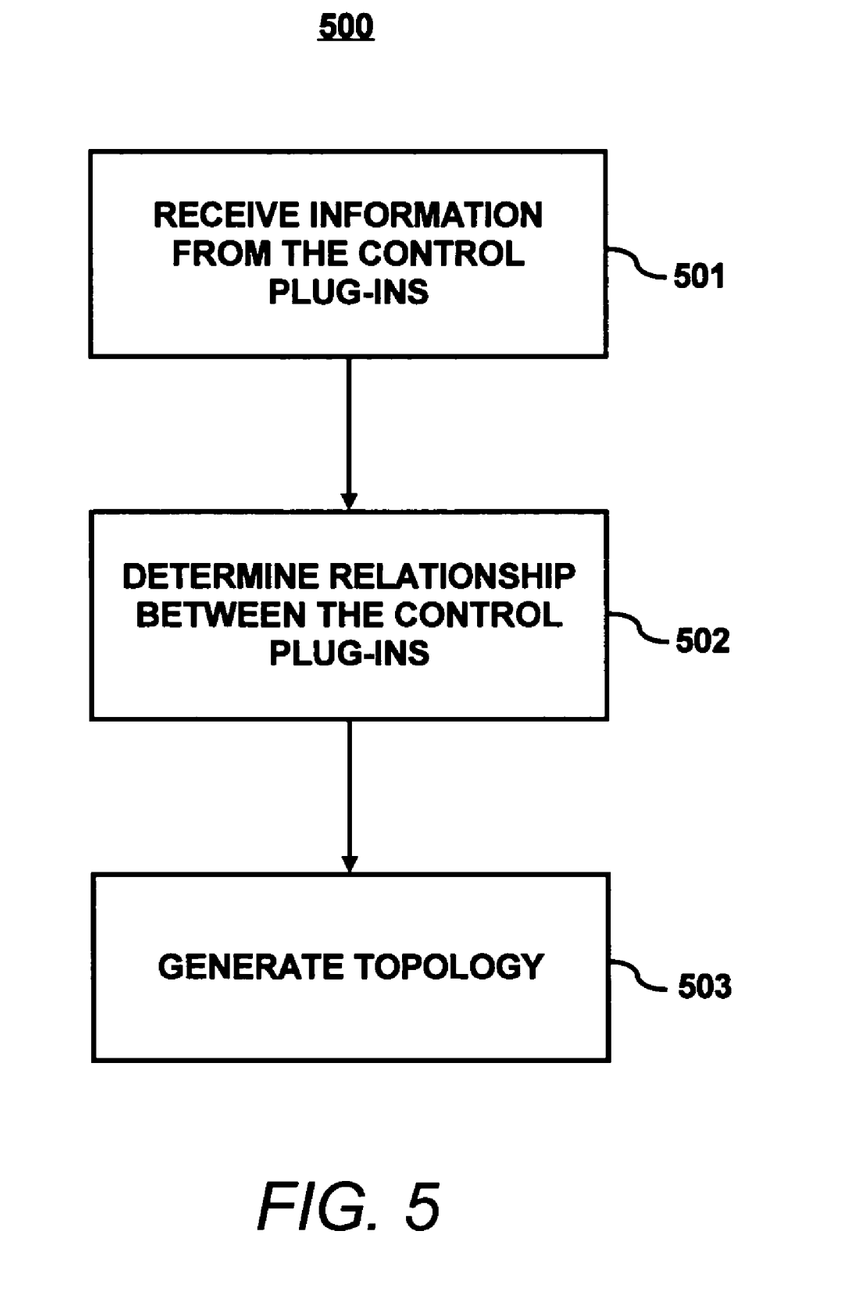
FIG. 5 illustrates a flow chart of a method for generating a topology of control plug-in organized in a hierarchy, according to an embodiment.

FIG. 5 illustrates a flow chart of a method 500 for generating a topology of control plug-ins organized in a hierarchy, according to an embodiment. The method 500 is described with respect to FIGS. 1-4 by way of example and not limitation.

At step 501, the management system 150 receives information from the control plug-ins organized in a hierarchy. This may include relationship and property information. At step 502, the management system 150 determines relationships between the control plug-ins based on the received information. Relationships may include parent-child relationships. At step 502, the management system 150 generates the topology 160 based on the determined relationships.

The steps of the method 500 may be implemented as software embedded on a computer readable medium, such as a computer readable medium in the management system 150 of FIG. 1.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method comprising:
   receiving information from a plurality of control plug-ins organized in a hierarchy, wherein the plurality of control plug-ins control an allocation of resources for at least one application,
      wherein the plurality of control plug-ins are operable to communicate information to parent or child control plug-ins in the hierarchy to control the allocation of the resources to the at least one application,
      and each control plug-in is software executable by a computer system to implement a policy to control the allocation of the resources to the at least one application;
   determining relationships between the plurality of control plug-ins based on the received information; and
   generating a topology of the plurality of control plug-ins based on the determined relationships.

2. The method of claim 1, wherein receiving information from a plurality of control plug-ins organized in a hierarchy further comprises:

receiving at least one of a reference to a parent control plug-in and a reference to at least one child control plug-in for each of the plurality of control plug-ins.

3. The method of claim 1, wherein receiving information from a plurality of control plug-ins organized in a hierarchy further comprises:
receiving property information for each of the plurality of control plug-ins.

4. The method of claim 1, wherein receiving property information for each of the plurality of control plug-ins further comprises:
receiving information associated with at least one of a version, a system administrator associated with the control plug-in, and a customer associated with the control plug-in.

5. The method of claim 1, further comprising:
determining changes in relationships between control plug-ins of the plurality of control plug-ins; and
modifying the topology based on the determined changes in relationships.

6. The method of claim 5, wherein determining changes in relationships between control plug-ins of the plurality of control plug-ins further comprises:
receiving event information subscribed to by control plug-ins; and
determining the changes in relationships based on the event information.

7. The method of claim 6, wherein receiving event information subscribed to by control plug-ins further comprises:
receiving event information associated with an addition or a removal of a control plug-in from the hierarchy.

8. The method of claim 7, further comprising:
receiving event information associated with a removal of a control plug-in from the hierarchy;
removing a representation of the control plug-in from the topology; and
removing representations of all children of the removed control plug-in from the topology.

9. The method of claim 1, wherein generating a topology of the plurality of control plug-ins based on the determined relationships further comprises:
representing each of the plurality of control plug-ins as a node in the topology;
linking each node in the topology based on the determined relationships, such that the topology of nodes mirrors the hierarchy of the plurality of control plug-ins.

10. The method of claim 1, further comprising:
communicating with the plurality of control plug-ins to receive at least one of updated property information and changes to the hierarchy.

11. A system comprising:
a management system receiving information from a plurality of control plug-ins organized in a hierarchy in a control system, wherein the plurality of control plug-ins control an allocation of resources for at least one application,
wherein the plurality of control plug-ins are operable to communicate information to parent or child control plug-ins in the hierarchy to control the allocation of the resources to the at least one application,
and each control plug-in is software executable by a computer system to implement a policy to control the allocation of the resources to the at least one application;
a topology generator in the management system, the topology generator generating a topology of the plurality of control plug-ins based on the received information.

12. The system of claim 11, wherein the received information comprises at least one of a reference to a parent control plug-in and a reference to at least one child control plug-in for each of the plurality of control plug-ins.

13. The system of claim 12, wherein the topology comprises a plurality of nodes representing each of the plurality of control plug-ins and links linking each node based on parent-child relationships.

14. The system of claim 11, wherein the topology generator determines changes in relationships between control plug-ins of the plurality of control plug-ins and modifies the topology based on the determined changes in relationships.

15. The system of claim 11, wherein the topology generator determines whether a control plug-in is removed from the hierarchy and removes the corresponding node in the topology and any child nodes of the corresponding node.

16. The system of claim 11, wherein the managements system communicates with the plurality of control plug-ins to receive at least one of property information and information associated with changes in the hierarchy.

17. An apparatus comprising:
means for receiving relationship information for a plurality of control plug-ins organized in a hierarchy in a control system, wherein the plurality of control plug-ins control an allocation of resources for at least one application,
wherein the plurality of control plug-ins are operable to communicate information to parent or child control plug-ins in the hierarchy to control the allocation of the resources to the at least one application,
and each control plug-in is software executable by a computer system to implement a policy to control the allocation of the resources to the at least one application;
means for generating a topology of the hierarchy of control plug-ins based on the received relationship information.

18. The apparatus of claim 17, further comprising:
means for receiving information associated with any changes to the hierarchy of control plug-ins; and
means for modifying the topology to mirror the hierarchy of control plug-ins.

19. A control plug-in embodied on a tangible computer readable storage medium and comprising code, that when executed, causes a computer to perform the following:
storing relationship information for the control plug-in in a data structure, wherein the relationship information comprises at least one of a parent reference to a parent control plug-in and a child reference to a child control plug-in in the hierarchy,
wherein the control plug-in is operable to communicate information to the parent or the child control plug-in in the hierarchy to control an allocation of resources to at least one application,
and each control plug-in is software executable by a computer system to implement a policy to control the allocation of the resources to the at least one application;
a discovery port for receiving the relationship information from at least one of the parent control plug-in and the child control plug-in; and
a maintenance port for transmitting the relationship information to a management system to generate a topology of the hierarchy.

20. The control plug-in of claim 19, wherein the data structure stores property information including attributes for the control plug-in.

21. The control plug-in of claim 20, further comprising a property port for transmitting the property information to the managements system.

* * * * *